US008085184B2

(12) United States Patent
Takabayashi et al.

(10) Patent No.: US 8,085,184 B2
(45) Date of Patent: Dec. 27, 2011

(54) RADAR DEVICE AND PROCESSING METHOD THEREFOR

(75) Inventors: Yuuki Takabayashi, Chiyoda-ku (JP); Hiroshi Kameda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 444 days.

(21) Appl. No.: 12/421,926

(22) Filed: Apr. 10, 2009

(65) Prior Publication Data
US 2009/0309782 A1 Dec. 17, 2009

(30) Foreign Application Priority Data

Jun. 12, 2008 (JP) .................................. 2008-154310
Oct. 23, 2008 (JP) .................................. 2008-273239

(51) Int. Cl.
*G01S 13/00* (2006.01)
*G01S 13/08* (2006.01)
*G01S 13/58* (2006.01)

(52) U.S. Cl. .............. 342/70; 342/89; 342/95; 342/104; 342/109; 342/118; 342/128

(58) Field of Classification Search .............. 342/70–72, 342/89–97, 104, 109, 118, 128, 129
See application file for complete search history.

(56) References Cited

U.S. PATENT DOCUMENTS

| | | | | | |
|---|---|---|---|---|---|
| 5,612,699 | A | * | 3/1997 | Yamada | 342/70 |
| 5,731,778 | A | * | 3/1998 | Nakatani et al. | 342/70 |
| 5,864,314 | A | * | 1/1999 | Ashihara | 342/128 |
| 5,905,458 | A | * | 5/1999 | Ashihara | 342/70 |
| 6,067,048 | A | * | 5/2000 | Yamada | 342/382 |
| 6,072,422 | A | * | 6/2000 | Yamada | 342/70 |
| 6,121,917 | A | * | 9/2000 | Yamada | 342/128 |
| 6,320,531 | B1 | * | 11/2001 | Tamatsu | 342/109 |
| 6,445,339 | B1 | * | 9/2002 | Yamada | 342/128 |
| 6,657,582 | B2 | * | 12/2003 | Seki et al. | 342/70 |
| 6,690,319 | B2 | * | 2/2004 | Matsui et al. | 342/70 |
| 6,753,805 | B2 | * | 6/2004 | Nakanishi et al. | 342/128 |
| 6,788,247 | B2 | * | 9/2004 | Mitsumoto et al. | 342/109 |
| 6,856,278 | B2 | * | 2/2005 | Nakanishi et al. | 342/128 |

(Continued)

FOREIGN PATENT DOCUMENTS

| | | |
|---|---|---|
| JP | 7-63842 | 3/1995 |
| JP | 2765767 | 4/1998 |
| JP | 2778864 | 5/1998 |

*Primary Examiner* — Thomas Tarcza
*Assistant Examiner* — Peter Bythrow
(74) *Attorney, Agent, or Firm* — Oblon, Spivak, McClelland, Maier & Neustadt, L.L.P.

(57) ABSTRACT

According to a conventional method of correlating beat frequencies in a radar device, a detecting state of a target differs at the time of up-chirping and at that of down-chirping, so that, when the number of peaks of beat frequencies does not match with each other, there occurs a situation in which the beat frequencies cannot be accurately correlated.

The radar device herein provided includes a transmission unit for transmitting a frequency-modulated continuous wave (FMCW) signal; a reception unit for generating a beat signal from the transmission signal and a reception signal corresponding thereto; a beat-frequency generating unit for obtaining a beat-frequency distribution corresponding to the beat signal; an up-chirp beat-frequency tracking means and a down-chirp beat-frequency tracking means for performing tracking processing on a beat signal; and an up-chirp target-detection means and a down-chirp target-detection means for calculating a range and range-change rate to a target based on a beat signal's frequency distribution.

26 Claims, 9 Drawing Sheets

U.S. PATENT DOCUMENTS

| | | | |
|---|---|---|---|
| 6,924,762 B2 * | 8/2005 | Miyake et al. | 342/70 |
| 6,970,129 B2 * | 11/2005 | Kumon et al. | 342/70 |
| 7,466,260 B2 * | 12/2008 | Ishii et al. | 342/70 |
| 2006/0181448 A1 * | 8/2006 | Natsume et al. | 342/70 |
| 2008/0088500 A1 * | 4/2008 | Ishii et al. | 342/109 |
| 2009/0309782 A1 * | 12/2009 | Takabayashi et al. | 342/105 |

* cited by examiner

RADAR DEVICE AND PROCESSING METHOD THEREFOR

BACKGROUND OF THE INVENTION

1. Field of the Invention

The present invention relates to radar devices that are mounted on vehicles such as motor and flying vehicles, and used for preventing those vehicles from colliding, for performing follow-up driving while maintaining a certain distance and so forth, and, in particular, to a radar device (FMCW radar: frequency-modulated continuous wave radar) that detects, by transmission/reception of a radar wave, a range and range-change rate (relative velocity) to targets each existing outside the vehicle, and the device's processing method.

2. Description of the Related Art

In a conventional radar device, as shown in FIG. 1, there transmitted as a radar wave is a transmission signal of a carrier-wave being frequency-modulated by a triangular modulation signal to demonstrate a periodically constant and repeated increase/decrease in signal frequency. The radar wave reflected by a target is received by the device, and at the same time, a beat signal is generated by mixing the received signal with the transmission signal. The frequency of the beat signal (beat frequency) is measured in sweep intervals each, i.e., at the time of up-chirping when the frequency of the transmission signal increases and, at the time of down-chirping when the frequency of the transmission signal decreases; and then, based on an up-chirping beat frequency $f_{bu}$ and a down-chirping beat frequency $f_{bd}$ having been measured, a range R and range-change rate V to a target is calculated by using Equations (1) and (2), respectively.

$$R = \frac{cT}{4B}(f_{bu} + f_{bd}) \quad (1)$$

$$V = \frac{c}{4f_0}(f_{bu} - f_{bd}) \quad (2)$$

Here, the parameter B denotes a frequency modulation width corresponding to a transmission signal; the parameter $f_0$, the center frequency of the transmission signal; the parameter T, one periodic sweep time-interval for each of an up-chirp and a down-chirp; and the parameter c, the speed of light.

As described above, in such a conventional radar device, it is possible to detect a range and range-change rate to the target by correlating an up-chirping beat frequency $f_{bu}$ with a down-chirping beat frequency $f_{bd}$. However, even if each of the beat frequencies obtained in up-chirping and down-chirping is a beat frequency associated with the same or identical target, a frequency offset is caused therebetween. In addition, in such a state in which a plurality of targets exists, a plurality of reception signals is obtained from the targets, and therefore a plurality of beat frequencies is generated, so that it is necessary to determine which of beat frequencies at the time of up-chirping correlates with which of beat frequencies at the time of down-chirping. As a measure to this, a method of handling an environment with a plurality of targets is disclosed in which, in order to correlate beat frequencies obtained at the time of up-chirping and at that of down-chirping, beat frequencies obtained in every up-chirping sweep period are arranged in ascending order and beat frequencies obtained in every down-chirping sweep period are arranged in ascending order, and correlating the beat frequencies obtained at the time of up-chirping and at that of down-chirping is carried out so as to maintain both of the arrangements (for example, refer to "Millimeter-wave Radar Distance and Velocity Measurement Device," Japanese Patent Publication No. 2778864).

PROBLEMS TO BE SOLVED BY THE INVENTION

However, in a correlation of the beat frequencies by such a method described above, when there exists a beat frequency due to unwanted signal components other than those due to a target in either an up-chirping beat frequency or a down-chirping beat frequency, namely, in a case in which a detecting state of the target differs at the time of up-chirping or at the time of down-chirping, and the number of peaks of beat frequencies does not match with each other, there occurs a situation in which the correlation of the beat frequencies cannot be accurately carried out.

The present invention has been directed at solving those problems described above, and an object of the invention is to provide a radar device and it's processing method that are able to accurately calculate a range and range-change rate to a target even when the number of peaks of beat frequencies differs from each other at the time of up-chirping and at that of down-chirping.

SUMMARY OF THE INVENTION

Means for Solving the Problems

In order to achieve the object described above, a radar device according to the present invention comprises: a transmission means for generating a transmission signal whose frequency periodically increases and decreases in a constant modulation width, and for radiating the transmission signal into space; a reception means for acquiring a reception signal by receiving a reflected signal of the transmission signal by a target, and for generating a beat signal by mixing the reception signal with the transmission signal; a beat-frequency generating means for obtaining a first beat-frequency distribution from the beat signal at the time of up-chirping in which the frequency of the transmission signal ascends so as to determine a frequency peak in the first beat-frequency distribution, and for obtaining a second beat-frequency distribution from the beat signal at the time of down-chirping in which the frequency of the transmission signal descends so as to determine a frequency peak in the second beat-frequency distribution; an up-chirp beat-frequency tracking means for performing tracking processing on a frequency peak in the first beat-frequency distribution over a span of a plurality of up-chirping time-intervals, and for generating first beat-frequency time-series data from the frequency peak whose correlation is obtained by the tracking processing; an up-chirp target-detection means for calculating a first range and range-change rate to the target from the first beat-frequency time-series data; a down-chirp beat-frequency tracking means for performing tracking processing on a frequency peak in the second beat-frequency distribution over a span of a plurality of down-chirping time-intervals, and for generating second beat-frequency time-series data from the frequency peak whose correlation is obtained by the tracking processing; and a down-chirp target-detection means for calculating a second range and range-change rate to the target from the second beat-frequency time-series data.

Effects of the Invention

According to the radar device in the present invention, by performing tracking processing on the beat frequencies each obtained at the time of up-chirping and at that of down-chirping, it is possible to enhance, in comparison to a radar device using a conventional FMCW radar apparatus, the accuracy of pairing an up-chirping beat frequency with a down-chirping beat frequency.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereunder, preferred embodiments according to the present invention will be described in detail with reference to the accompanying drawings.

Embodiment 1

Figure 2:
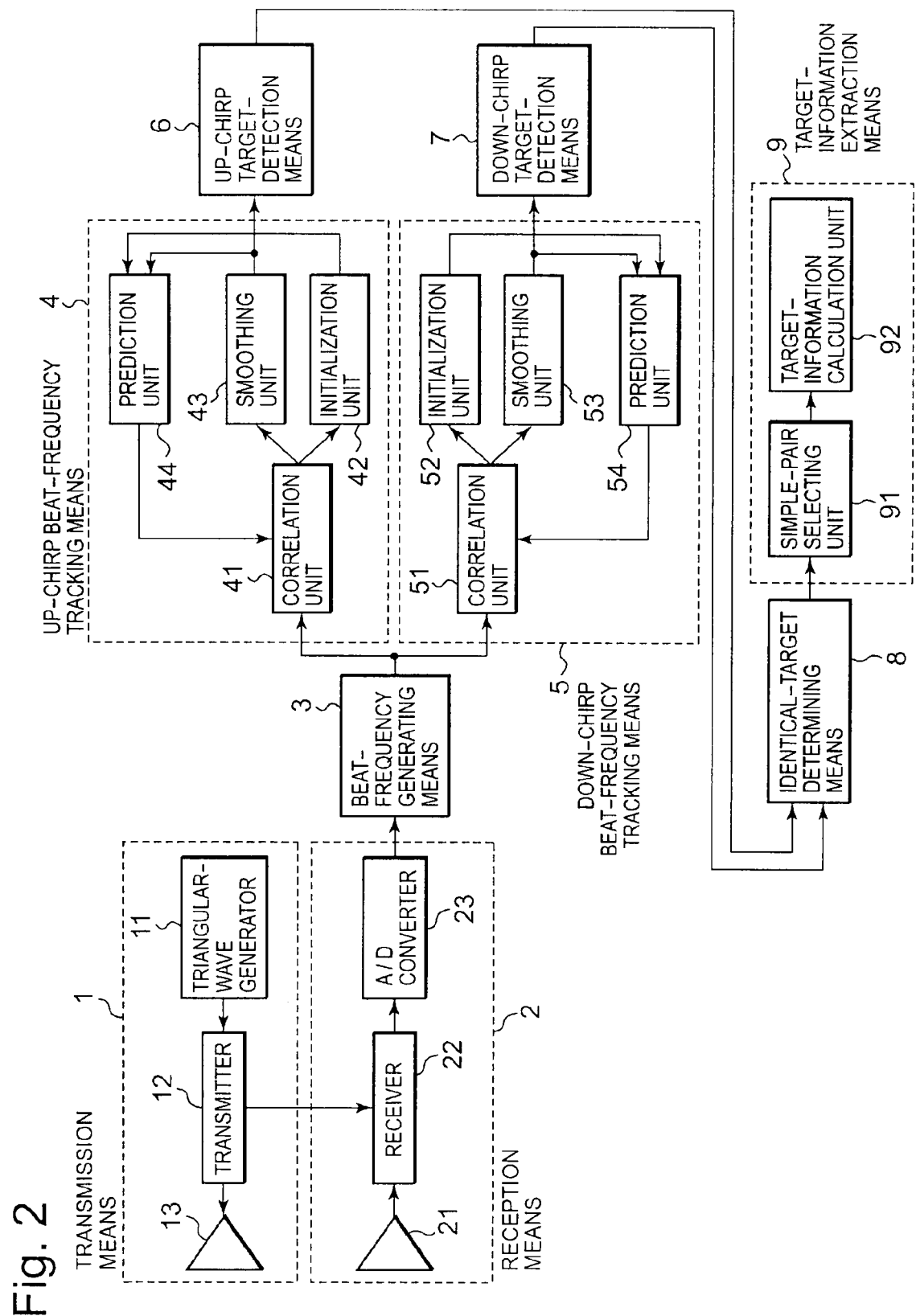
FIG. 2 is a diagram showing a configuration of a radar device in Embodiment 1 of the present invention.

FIG. 2 is a block diagram showing a configuration of a radar device in Embodiment 1. The radar device in this embodiment includes a transmission means 1, a reception means 2, a beat-frequency generating means 3, an up-chirp beat-frequency tracking means 4, a down-chirp beat-frequency tracking means 5, an up-chirp target-detection means 6, a down-chirp target-detection means 7, an identical-target determining means 8, and a target-information extraction means 9.

Figure 1:
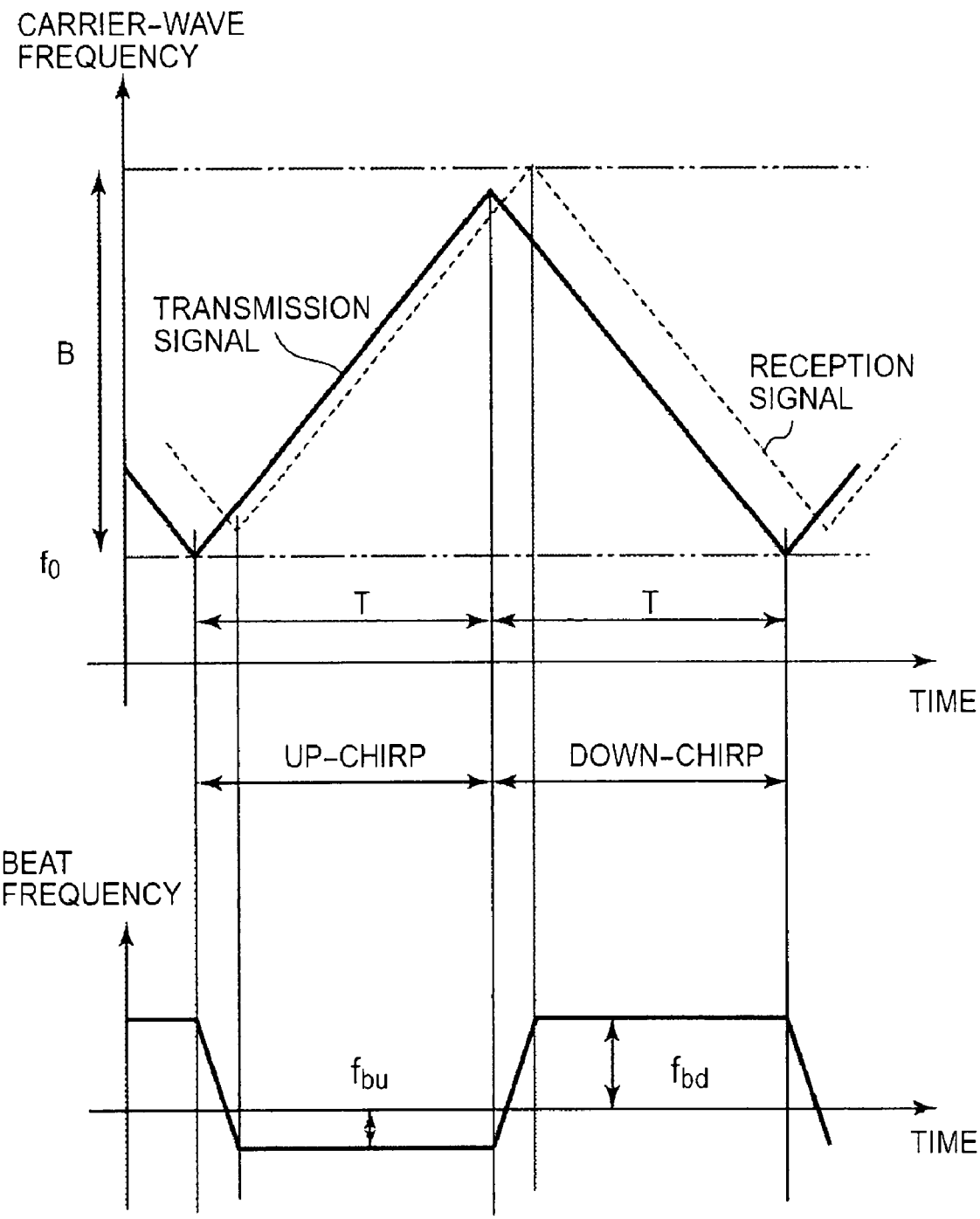
FIG. 1 is a diagram illustrating changes in carrier-wave frequencies associated with transmission/reception signals transmitted/received by a radar device, and changes in a beat frequency attributed to a beat signal.

Next, the operations of the radar device will be explained. The transmission means 1 generates a transmission signal, and radiates the transmission signal into space. To be specific, a triangular periodic signal is generated by a triangular-wave generator 11, and is supplied into a transmitter 12 as a modulation signal. Based on the modulation signal, the transmitter 12 generates a transmission signal by frequency-modulating a carrier wave, and transmits the transmission signal from a transmitting antenna 13. The frequency corresponding to the transmission signal eventually changes, as shown in FIG. 1, with a period T in each of sweep time-intervals for each of an up-chirp and a down-chirp in the bounds of a frequency modulation width B.

The reception means 2 receives, as a reception signal, a reflected transmission signal having been transmitted by the transmission means 1 and reflected by a target, and generates a beat signal from the reception signal and the transmission signal having been generated by the transmitter 12. To be specific, a reception signal is received by a receiving antenna 21, and a receiver 22 generates a beat signal from the reception signal and the transmission signal having been generated by the transmitter 12. The beat signal is converted into a digital signal by an analog-to-digital (A/D) converter 23, and the digital signal is outputted into the beat-frequency generating means 3.

Figure 3:
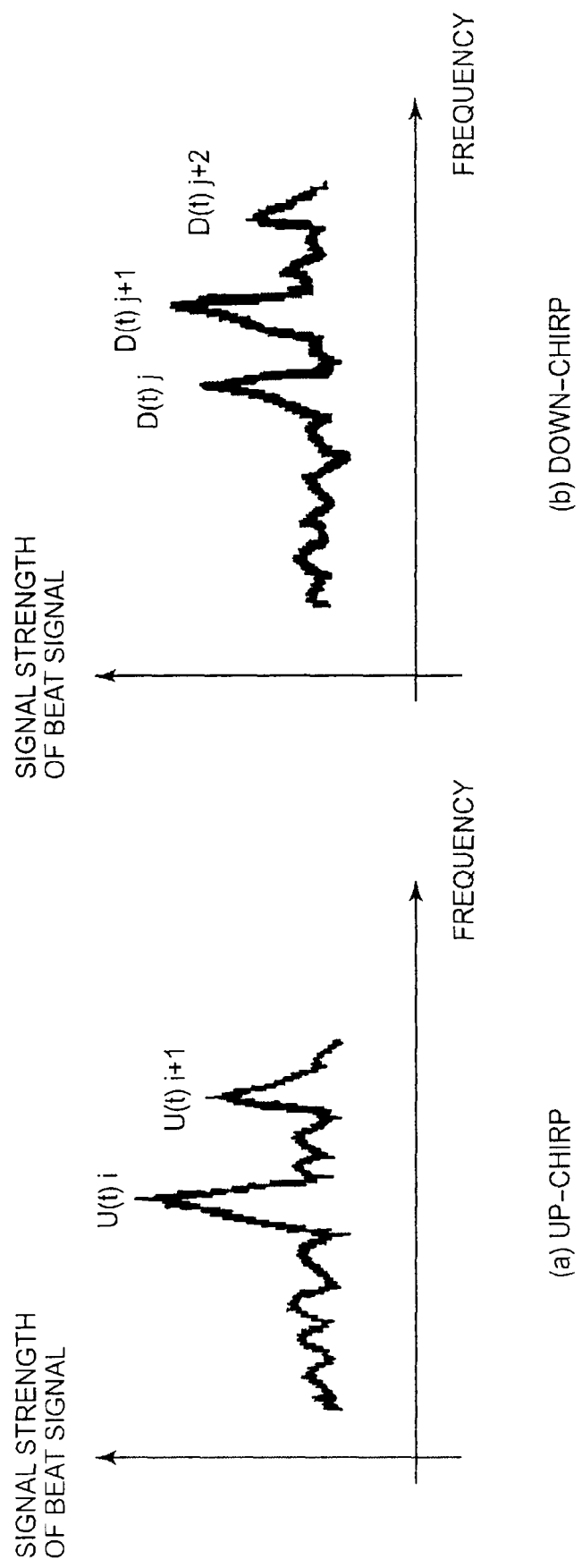
FIGS. 3a and 3b are diagrams each showing signal strength of a beat signal.

The beat-frequency generating means 3 performs, by using a fast Fourier transform (FFT) or the like, frequency analysis of the beat signal in each of the periodic sweep intervals. FIGS. 3a and 3b each show one example of frequency distribution of a beat signal in one periodic interval at the time of up-chirping and at the time of down-chirping. The beat-frequency generating means 3 extracts from a frequency distribution of the beat signal a beat-signal's peak frequency $U(t)i$ at the time of up-chirping and a beat-signal's peak frequency $D(t)j$ at the time of down-chirping. Here, the parameters "i" and "j" each denote the number to distinguish the peaks; the parameter "t" denotes sweep time at which the beat frequency has been obtained. The beat-signal's peak frequency $U(t)i$ obtained by the beat-frequency generating means 3 at the time of up-chirping is outputted into the up-chirp beat-frequency tracking means 4; the beat-signal's peak frequency $D(t)j$ obtained by the beat-frequency generating means 3 at the time of down-chirping is outputted into the down-chirp beat-frequency tracking means 5.

Figure 4:
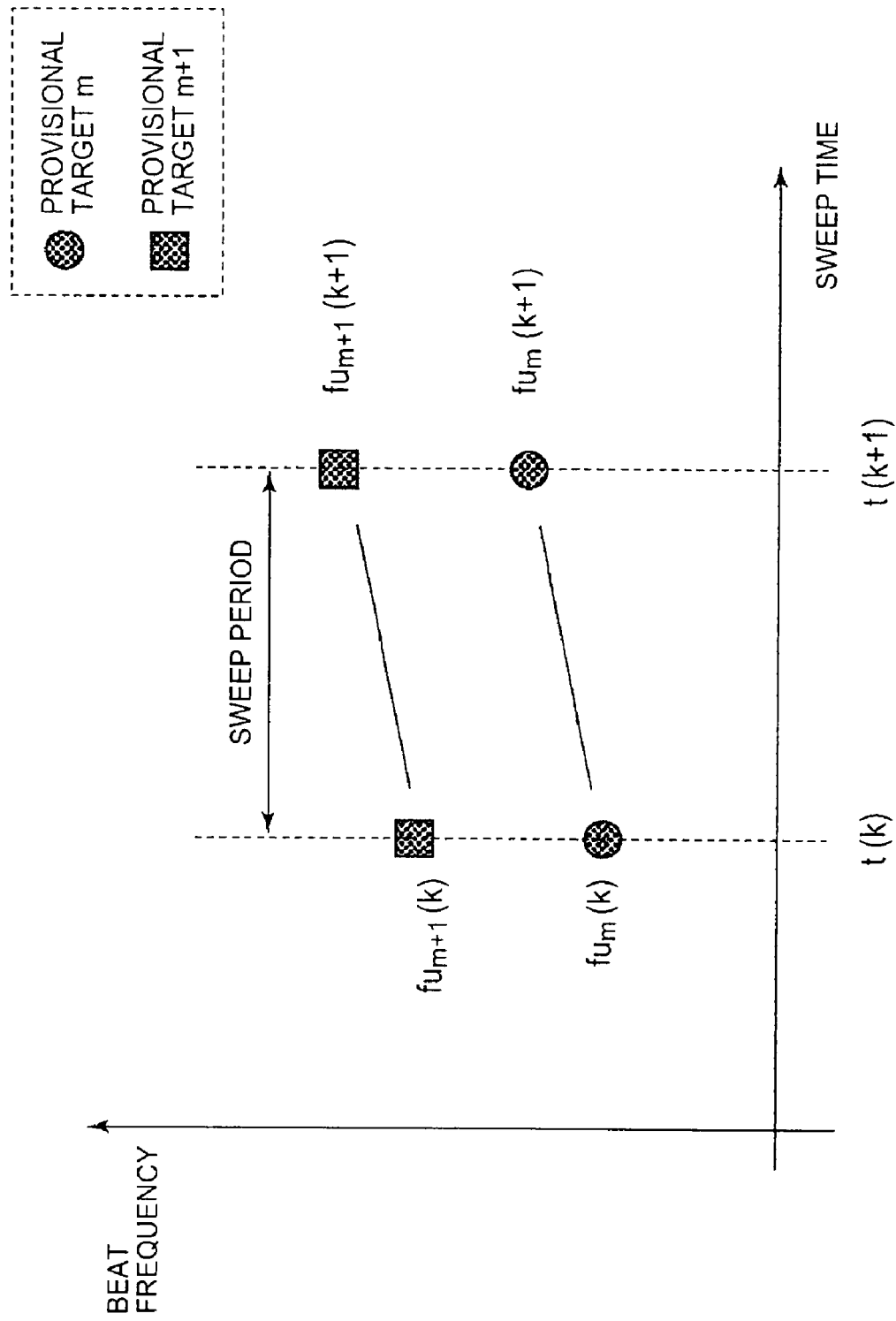
FIG. 4 is a diagram for explaining tracking operations on targets.

The up-chirp beat-frequency tracking means 4 performs tracking processing on a peak frequency of a beat-signal at the time of up-chirping. FIG. 4 is a conceptual diagram for explaining the overall tracking processing. FIG. 4 shows an example in which, when there are two peak frequencies obtained at sweep time $t(k)$ and two peak frequencies obtained at sweep time $t(k+1)$, two respective peak frequencies are correlated with the provisional targets, by using a predicted beat frequency of an existing provisional detection target (not shown in the figure), as two provisional targets (provisional target "m" and provisional target "m+1"). Here, it is indicated that peak frequencies $fu_m(k)$ and $fu_m(k+1)$ are determined as the peak frequencies of the provisional target "m," and peak frequencies $fu_{m+1}(k)$ and $fu_{m+1}(k+1)$ are determined as the peak frequencies of the provisional target "m+1." Note that, with respect to the peak frequencies correlated with each other, processing to calculate a true value of the beat frequency is also performed by using a predicted beat frequency of an existing provisional detection target.

Next, the up-chirp beat-frequency tracking means 4 will be explained. First, a dynamic model of a target in the tracking processing is described. A beat-frequency vector $x^u{}_k(m)$ of a provisional target m (m=1, 2, ..., M) at sweep time $t(k)$ is defined in Equation (3), and the dynamic model is defined in Equation (4). Note that, a superscript suffix u of a state vector x denotes "up-chirping." The beat-frequency vector x has, as its components, a beat frequency $u_k$ and the amount of its time-based change. In Equation (3), a superscript suffix T indicates transpose of the vector. The term $\Phi_k$ is a state transition matrix from sweep time $t(k)$ to sweep time $t(k+1)$ defined by Equation (5), and movement of the target is assumed to be a linear uniform motion. Here, "Δt" denotes the difference-time between sweep times $t(k)$ and $t(k+1)$. In addition, "$w_k$" is a process noise vector at sweep time $t(k)$; the process noise vector has a set of a mean value 0 (zero) and variance $Q_k$ as expressed in Equation (6).

$$x_k^u(m) = [\begin{array}{cc} u_k & \dot{u}_k \end{array}]^T \quad (3)$$

$$x_{k+1}^u = \Phi_k x_k^u + w_k \quad (4)$$

$$\Phi_k = \begin{bmatrix} 1 & \Delta t \\ 0 & 1 \end{bmatrix} \quad (5)$$

$$E[w_k] = 0, \quad E[w_k w_k^T] = Q_k \quad (6)$$

Next, an measurement model in the tracking processing will be described. The measurement model of an observed value is defined as expressed by Equation (7). Here, the parameter $z_k^u$ denotes the observed value of a beat frequency; "H," an measurement matrix defined by Equation (8); and "$v_k$," an measurement noise that has a set of a mean value 0 (zero) and measurement error variance $R_k$ as expressed in Equation (9).

$$z_k^u = H x_k^u + v_k \quad (7)$$

$$H = [1\ 0] \quad (8)$$

$$E[v_k] = 0, E[v_k^2] = R_k \quad (9)$$

The up-chirp beat-frequency tracking means 4 performs the tracking processing on an observed value of the peak frequency of a beat signal (hereinafter referred to as a "beat frequency") in which the beat-frequency generating means 3 outputs at the time of up-chirping. First, in a correlation unit 41, it is determined whether or not an observed up-chirping beat-frequency value $u_k$ outputted by the beat-frequency generating means 3 at sweep time t(k) satisfies an inequality equation expressed by Equation (10). In Equation (10), the parameter d denotes a determination threshold-value; and the parameter S, measurement prediction variance of a provisional target m defined in Equation (11). In addition, "$P_{k|k-1}$" in Equation (11) denotes a state prediction covariance matrix whose calculation is carried out in a prediction unit 44 as will be described later. The parameter $\tilde{u}_{k|k-1}$ is a predicted value of a beat frequency for a provisional target m at sweep time t(k) obtained by the prediction unit 44 to be described later; the parameter $\tilde{u}_{k|k-1}$ is calculated from a predicted value $\tilde{x}_{k|k-1}$ of a beat-frequency vector at sweep time t(k) by using Equation (12).

$$\frac{(u_k - \tilde{u}_{k|k-1}(m))^2}{S_{k|k-1}(m)} \leq d \quad (10)$$

$$S_{k|k-1}(m) = H P_{k|k-1}(m) H^T + R_k \quad (11)$$

$$\tilde{u}_{k|k-1}(m) = H \tilde{x}_{k|k-1}^u(m) \quad (12)$$

The correlation unit 41 determines that, when there is no provisional target whose beat frequency satisfies the inequality equation expressed by Equation (10), "there exists no correlation." And then, in a case in which "there exists no correlation," the beat frequency is registered as a beat frequency for a new provisional target in an initialization unit 42. When registering, by using initial forms of a beat-frequency vector $x^u_0(m)$ and a smoothing-error covariance matrix $P_0(m)$ as expressed in respective Equations (13) and (14), a updated state estimate vector and a updated state covariance matrix are specified. In Equation (14), the parameter $R_0$ designates measurement error variance, and the parameter $v_{max}$ is a maximum value of the amount of beat-frequency's change. In addition, sweep time given to the beat frequency is also specified. Moreover, a tracking quality TQ-value for the new provisional target is set to 0 (zero) as indicated in Equation (15). In addition, the total number "M" of provisional targets is incremented by 1 (one).

$$x_0^u(m) = [\begin{array}{cc} u_0 & 0 \end{array}]^T \quad (13)$$

$$P_0(m) = \begin{bmatrix} R_0 & 0 \\ 0 & v_{max}^2 \end{bmatrix} \quad (14)$$

$$TQ(m) = 0 \quad (15)$$

The correlation unit 41 determines that, when there is a provisional target whose beat frequency satisfies the inequality equation expressed by Equation (10), "there exists correlation." And then, in a case in which "there exists correlation," the beat frequency is registered in a smoothing unit 43 as an observed beat-frequency value whose correlation has been obtained for a provisional target m, and a state update of the provisional target m is performed using Equations (16) through (19). In Equation (16), a updated state estimate $\hat{x}^u_{k|k}$ at sweep time t(k) is calculated by using an observed beat-frequency value $u_k$ and a predicted value $\tilde{u}_{k|k-1}$ of a beat-frequency state vector. In addition, a updated state covariance matrix $P_{k|k}$ is calculated by Equation (17). A gain matrix $K_k$ is defined by Equation (18). Moreover, the tracking quality TQ-value for the provisional target m is incremented by one (refer to Equation (19)). At this time, when the TQ-value exceeds a prespecified upper-limit value TQmax, the TQ-value is fixed at the TQmax (refer also to Equation (19)).

$$\hat{x}^u_{k|k}(m) = \tilde{x}^u_{k|k-1}(m) + K_k[u_k - H\tilde{x}^u_{k|k-1}(m)] \quad (16)$$

$$P_{k|k}(m) = [I - K_k H] P_{k|k-1}(m) \quad (17)$$

$$K_k = \frac{P_{k|k-1}(m) H^T}{S_{k|k-1}(m)} \quad (18)$$

$$TQ(m) = \min\{TQ(m) + 1, TQ_{max}\} \quad (19)$$

On the other hand, as for a provisional target m that has been registered, but a beat frequency having correlation is not obtained therefor, the smoothing unit 43 performs a state update of the provisional target m using Equations (20) through (22). A updated state estimate $\hat{x}^u_{k|k}$ at sweep time t(k) is calculated by Equation (20), and a updated state covariance matrix $P_{k|k}$, by Equation (21). In addition, the memory-track tracking-quality TQ-value being stored is decremented by one (refer to Equation (22)). At this time, when the TQ-value falls below a prespecified lower-limit value TQmin, the TQ-value is fixed at the TQmin (refer also to Equation (22)).

$$\hat{x}_{k|k}^u(m) = \tilde{x}_{k|k-1}^u(m) \quad (20)$$

$$P_{k|k}(m) = P_{k|k-1}(m) \quad (21)$$

$$TQ(m) = \min\{TQ(m) - 1, TQ_{min}\} \quad (22)$$

The prediction unit 44 calculates, by using either a updated state estimate and a updated state covariance matrix obtained by the smoothing unit 43 corresponding to sweep time t(k), or a updated state estimate and a updated state covariance matrix specified in the initialization unit 42 corresponding to sweep time t(k), a predicted state vector $\tilde{x}^u_{k+1|k}$ and a state prediction covariance matrix $P^u_{k+1|k}$ corresponding to sweep time t(k+1) (refer to Equation (23) and Equation (24)). Note that, a state transition matrix $\phi_k$ used in calculation is calculated by Equation (5) using difference-time $\Delta t$ (i.e., $\Delta t=t(k+1)-t(k)$) that is derived relative to sweep time $t(k+1)$ and given to a beat frequency newly supplied by the beat-frequency generating means 3.

$$\tilde{x}_{k+1|k}{}^u = \phi_k \tilde{x}_{k|k}{}^u \tag{23}$$

$$P_{k+1|k}{}^u = \phi_k{}^T P_{k|k}{}^u \phi_k + Q_k \tag{24}$$

A updated state estimate and a updated state covariance matrix calculated by the prediction unit 44 are used for correlation processing at sweep time $t(k+1)$ in the correlation unit 41 described above. By repeating the processing described above for each of sweep times, the tracking processing is executed for a provisional target.

The up-chirp target-detection means 6 receives time-series data of an up-chirping beat frequency whose correlation has been obtained for a provisional target m having been obtained by the up-chirp beat-frequency tracking means 4, and performs target-detection determination for the provisional target for which the tracking processing has been carried out by the up-chirp beat-frequency tracking means 4. Moreover, a range and range-change rate to the detected target is calculated.

In the up-chirp target-detection means 6, first, TQ-values each for a provisional target m (m=1, 2, ..., M) are sequentially received, and it is determined that target-detection has been performed for the provisional target at a time-point when a TQ-value exceeds a predetermined TQthre (threshold value). The provisional target having been determined as the target-detection is defined as a "detected target." In the up-chirp beat-frequency tracking means 4, there held and stored is time-series data that is a tracking-processing result corresponding to the detected target of a correlation-established up-chirping beat frequency, namely, a set of beat frequencies at different sampling times. There is the relation of Equation (25) between an up-chirping beat frequency $f^u_{b,k}(m)$ of a provisional target m a t an arbitrary sampling time $t_k$, and a range $R^u_k(m)$ to the target and range-change rate R-dot$^u$k(m) to the target. Although Equation (25) can be obtained at a sampling time $t_k$ each, a range to a target and range-change rate thereof is different at each of the sampling times; therefore, a plurality of such Equations (25) cannot be solved as a simultaneous equation for a range to a target and range-change rate thereof.

To this end, a range and range-change rate to a target at a reference sampling time $t_0$ is defined by Equation (26), and a range and range-change rate to the target at an arbitrary sampling time $t_k$ is modeled by Equation (27). Thus, based on the time-difference $\Delta$ between the reference sampling time $t_0$ and the arbitrary sampling time $t_k$ (refer to Equation (30)), a state transition matrix $\psi_k$ is defined as Equation (29); and then, using Equation (28), an up-chirping beat frequency at an arbitrary sampling time is expressed by a range and range-change rate at the reference sampling time. By rewriting Equation (25) using Equation (26) through Equation (30), a simultaneous equation can be obtained for a range and range-change rate to the target at the reference sampling time, so that, by solving the equation, it is possible to obtain the range and range-change rate to the target at the reference sampling time. A range and range-change rate at an arbitrary sampling time can be calculated by Equation (28) using a range and range-change rate to the target at the reference sampling time.

$$f^u_{b,k}(m) = \frac{2B}{cT} R^u_k(m) + \frac{f_0}{c} 2\dot{R}^u_k(m) \tag{25}$$

$$y^u_0 = [\; R^u_0 \quad \dot{R}^u_0 \;]^T \tag{26}$$

$$y^u_k = [\; R^u_k \quad \dot{R}^u_k \;]^T \tag{27}$$

$$y^u_k = \Psi_k y^u_0 \tag{28}$$

$$\Psi_k = \begin{bmatrix} 1 & \Delta \\ 0 & 1 \end{bmatrix} \tag{29}$$

$$\Delta = t_k - t_0 \tag{30}$$

The down-chirp beat-frequency tracking means 5 performs tracking processing on an observed value of the peak frequency of a beat signal outputted by the beat-frequency generating means 3 at the time of down-chirping. The configuration of the down-chirp beat-frequency tracking means 5 is similar to that of the up-chirp beat-frequency tracking means 4, and is configured to include a correlation unit 51, an initialization unit 52, a smoothing unit 53, and a prediction unit 54. What are performed in these units each are the same as the processing operations in those units of the up-chirp beat-frequency tracking means 4 described for Equations (1) through (24), and so their detailed explanation is omitted. However, in the respective equations, the superscript suffix d indicating "down-chirp" will be used in replace of the superscript suffix u indicating "up-chirp."

The down-chirp target-detection means 7 receives time-series data of a down-chirping beat frequency whose correlation has been obtained for a provisional target m having been derived by the down-chirp beat-frequency tracking means 5, and performs target-detection determination for the provisional target for which the tracking processing has been carried out by the down-chirp beat-frequency tracking means 5, followed by calculation of a range and range-change rate to the target. Specific processing operations are similar to the processing by the up-chirp target-detection means 6, and obey Equations (25) through (30); thus, their detailed explanation is omitted. However, it differs in that the superscript suffix d indicating "down-chirp" will be used in replace of the superscript suffix u indicating "up-chirp" in the respective equations, and in addition, the second term on the right-hand side in Equation (25) takes the minus sign (−).

Presuming that, in the up-chirp target-detection means 6 and the down-chirp target-detection means 7, a reference sampling time $t_0$ for a range and range-change rate to the target to be calculated is coincided with the same time, the up-chirp target-detection means 6 and the down-chirp target-detection means 7 each can thus calculate the range and range-change rate to the target at the same reference sampling time.

The identical-target determining means 8 receives the outputs from the up-chirp target-detection means 6 and the down-chirp target-detection means 7, and determines whether or not a detected target at the time of up-chirping and a detected target at the time of down-chirping correlate with the same or identical target. A criterion on the identical-target determination is that, when the difference between the range and range-change rate to the target m obtained at the time of up-chirping and that to the target n obtained at the time of down-chirping is within a constant bound, the ranges and rates for the target m and the target n are determined to correlate to an identical target (i.e., "pairing" of the detected targets is carried out). To be specific, for example, when Equation (31) and Equation (32) are simultaneously held, or an inequality equation expressed by Equation (33) is satisfied, it is determined as for an identical target. Note that, parameters ΔR and ΔR-dot in Equation (31) and Equation (32) are determination threshold-values of a range and range-change rate, respectively. In addition, parameters $\sigma_R$ and $\sigma_{R\text{-}dot}$ in Equation (33) are estimation accuracy of a range and estimation accuracy of a range-change rate, respectively; and these parameters are obtained by replacing a state prediction covariance matrix $P_{k|k-1}$ in Equation (11) by a updated state covariance matrix $P_{k|k}$ in Equation (17). Moreover, the parameter $\Delta$ in Equation (33) is a determination threshold-value.

$$|R^u(m) - R^d(n)| \leq \Delta R \tag{31}$$

$$|\dot{R}^u(m) - \dot{R}^d(n)| \leq \Delta \dot{R} \tag{32}$$

$$\frac{(R^u(m) - R^d(n))^2}{\sigma_R^2} + \frac{(\dot{R}^u(m) - \dot{R}^d(n))^2}{\sigma_{\dot{R}}^2} \leq \Delta \tag{33}$$

In the target-information extraction means 9, extraction of target information is performed. When there exists a plurality of combinations of target information each determined as for an identical target by the identical-target determining means 8, a simple-pair selecting unit 91 selects predominantly such combination that an evaluation value on the left-hand sides each in Equations (31) and (32) or that in Equation (33) is minimized.

The pairs of the ranges and range-change rates for the combination selected by the simple-pair selecting unit 91 with respect to up-chirping and down-chirping are inputted into a target-information calculation unit 92, where target information is derived in accordance with these ranges and range-change rates, and then outputted therefrom. In a method of deriving the target information, for example, either one of the pairs of ranges and range-change rates corresponding to up-chirping and down-chirping, which minimizes a volume of a updated state covariance matrix in Equation (17), is selected as the target information. In another method, according to such Equations (34) and (35), it is possible to determine the target information, by using every ranges and range-change rates of up-chirping and down-chirping having been determined for an identical target, and by calculating a weighted and combined range and range-change rate by the updated state covariance matrix in Equation (17).

$$R = (P_{k|k}(m) + P_{k|k}(n))^{-1} P_{k|k}(n) R^u(m) + (P_{k|k}(m) + P_{k|k}(n))^{-1} P_{k|k}(m) R^d(n) \tag{34}$$

$$\dot{R} = (P_{k|k}(m) + P_{k|k}(n))^{-1} P_{k|k}(n) \dot{R}^u(m) + (P_{k|k}(m) + P_{k|k}(n))^{-1} P_{k|k}(m) \dot{R}^d(n) \tag{35}$$

Note that, although a tracking means using beat frequencies is described in the above explanation, when information of an angle at a direction to which a target exists and that of signal power of a reflected wave from the target are available, it is possible to achieve functional enhancement by concurrently using these pieces of information and further adding those to a state vector.

According to the radar device in Embodiment 1 as described above, tracking processing on a beat frequency at the time of up-chirping and tracking processing on a beat frequency at the time of down-chirping are individually performed, so that it is possible to accomplish high tracking accuracy to the target.

After having completed the tracking processing, the pairing is carried out with a target detected at the time of up-chirping and a target detected at that of down-chirping; therefore, it is possible to reduce a probability that an erroneous pair is made when a pair of up-chirping and down-chirping is selected.

Moreover, in deriving target information, because ranges and range-change rates each to a target obtained at the times of up-chirping and down-chirping may be weighted and combined, and the range and range-change rate having been combined is made as the target information, so that the degree of accuracy of the target information can be increased.

Embodiment 2

Figure 5:
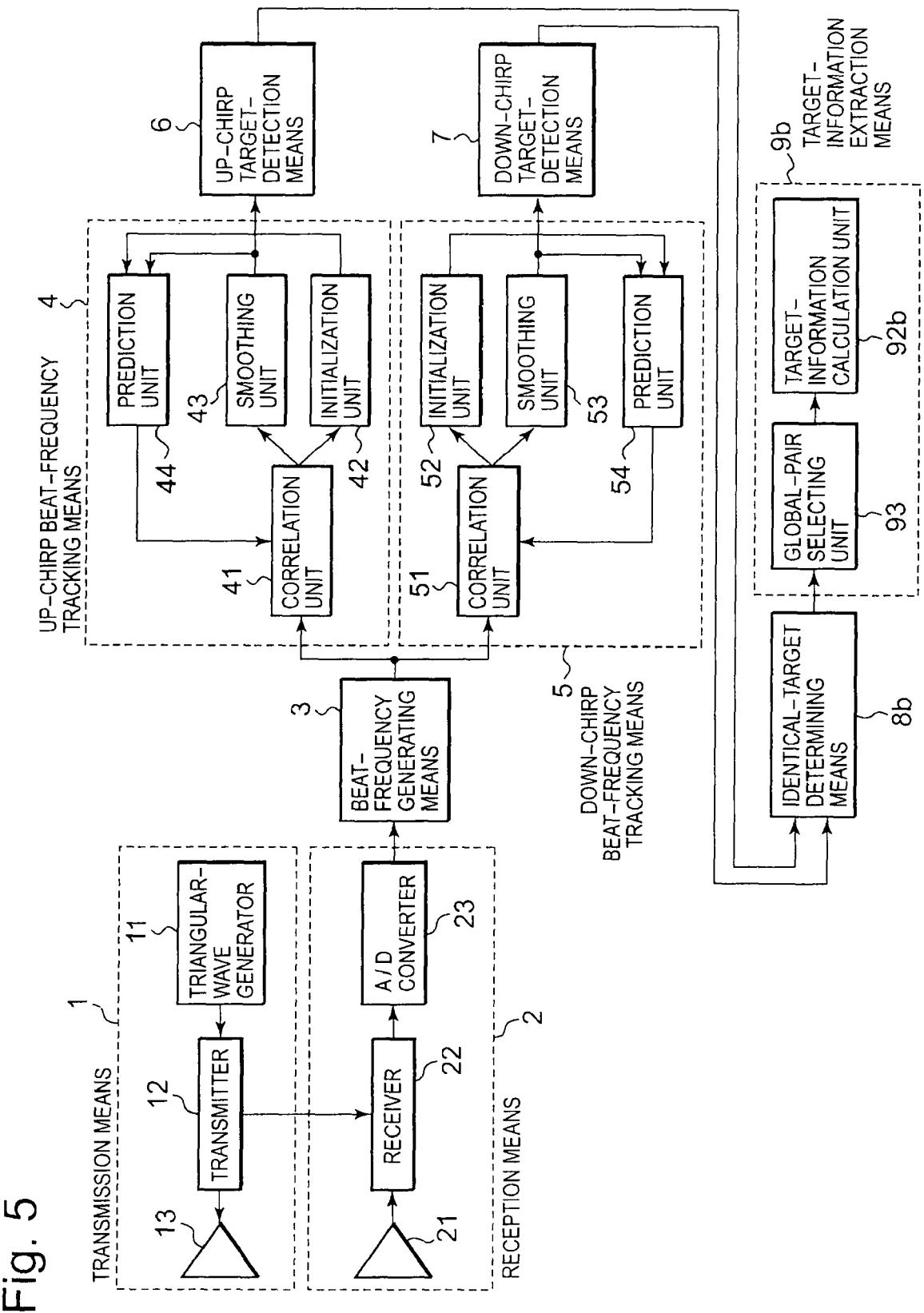
FIG. 5 is a diagram showing a configuration of a radar device in Embodiment 2 of the present invention.

The radar device in Embodiment 2 is so constructed that can calculate, at the same time with respect to a plurality of targets, a range and range-change rate to each of the targets. FIG. 5 is a block diagram showing a configuration of the radar device in Embodiment 2. In FIG. 5, the same reference numerals and symbols designate the same items as or items corresponding to those shown in FIG. 2. Because an identical-target determining means 8b differs in its processing operations from the identical-target determining means 8 in Embodiment 1, this will be described later. Moreover, a global-pair selecting unit 93 in a target-information extraction means 9b is added in place of the simple-pair selecting unit 91 in Embodiment 1. Other items and components take the same configuration in Embodiment 1; thus, their explanation is omitted.

In determination process on identical-target in the identical-target determining means 8b, when the difference between a range and range-change rate to a target m obtained at the time of up-chirping and a range and range-change rate to a target n obtained at the time of down-chirping is within a constant bound, namely Equation (36) is satisfied, it is determined that a combination (pair) obtained for of the target m and that for the target n is for the same or identical target. Here, parameters $\sigma_R$ and $\sigma_{R\text{-}dot}$ in Equation (36) are respective estimation accuracy of a range and that of range-change rate, and are the same as the values in Equation (33) used in Embodiment 1; the parameters $\sigma_R$ and $\sigma_{R\text{-}dot}$ are determined from a updated state covariance matrix calculated in the up-chirp beat-frequency tracking means 4 or the down-chirp beat-frequency tracking means 5. In addition, the parameter d is the value that is determined using a chi-square distribution table with two degrees of freedom. To be specific, a probability of target's existence is specified in a correlation area, and, based on a chi-square distribution table with two degrees of freedom, the parameter d that determines the correlation area may be defined.

Note that, as described in Embodiment 1, there is also a probability in which there exists a plurality of pairs that satisfies Equation (36), so that duplication in assignment occurs. In order to perform the processing that corresponds to such an environment with multiple targets, the identical-target determining means 8b makes a correlation matrix $\Omega(X)$ such as Equation (37). As for components $W_{ij}$ each in the correlation matrix $\Omega(X)$, when the detected target of a detected target-number "i" of up-chirping and the detected target of a detected target-number "j" of down-chirping form a combination of a pair that satisfies Equation (36), it is specified that $W_{ij}=1$; when Equation (36) is not satisfied, it is specified that $W_{ij}=0$.

The target-information extraction means 9b receives the correlation matrix $\Omega(X)$ having been derived by the identical-target determining means 8b, and selects the optimum combination out of pairs in which the identical-target determining means 8b has determined as for identical targets each. For example, it is presumed that there exist two targets in both up-chirping and down-chirping, and, as a result of determination by the identical-target determining means 8b based on Equation (36), the correlation matrix Ω(X) of Equation (38) is derived. As for a combination of detected targets allowable from Equation (38) in the up-chirping and the down-chirping, the combination expressed by a set of three matrices in Equation (39) can be presumed. Each of these matrices expresses three types of the hypothesis described below.

Hypothesis 1: "a detected target 1 in up-chirping and the detected target 1 in down-chirping," and "a detected target 2 in the up-chirping and the detected target 2 in the down-chirping,"

Hypothesis 2: "a detected target 1 in up-chirping and the detected target 1 in down-chirping," and Hypothesis 3: "a detected target 2 in up-chirping and the detected target 2 in down-chirping."

The global-pair selecting unit 93 in the target-information extraction means 9b selects, out of the individual hypotheses expressed by Equation (39), an hypothesis in which a sum of the values on the left-hand side in Equation (36) is minimized, as an optimal or the best-case hypothesis. That is to say, as for Hypothesis 1, a sum of a value on the left-hand side in Equation (36) with respect to "a detected target 1 in up-chirping and the detected target 1 in down-chirping" and a value on the left-hand side in Equation (36) with respect to "a detected target 2 in up-chirping and the detected target 2 in down-chirping" is given as an evaluation value for Hypothesis 1; as for Hypothesis 2, a value on the left-hand side in Equation (36) with respect to "a detected target 1 in up-chirping and the detected target 1 in down-chirping" is given as an evaluation value for Hypothesis 2; as for Hypothesis 3, a value on the left-hand side in Equation (36) with respect to "a detected target 2 in up-chirping and the detected target 2 in down-chirping" is given as an evaluation value for Hypothesis 3; and then, an hypothesis that gives the minimum value out of the evaluation values obtained for Hypothesis 1 through Hypothesis 3 is selected as an optimal or the best-case hypothesis.

$$\frac{(R^u(m) - R^d(n))^2}{\sigma_R^2} + \frac{(\dot{R}^u(m) - \dot{R}^d(n))^2}{\sigma_{\dot{R}}^2} \le d \tag{36}$$

$$\Omega(X) = W_{ij}(i = 1, 2, \ldots, I; j = 1, 2, \ldots, J) \tag{37}$$

$$= \begin{bmatrix} W_{11} & W_{12} & W_{13} & \ldots & W_{1J} \\ W_{21} & W_{22} & W_{23} & \ldots & W_{2J} \\ W_{31} & W_{32} & W_{33} & \ldots & W_{3J} \\ \vdots & \vdots & \vdots & \vdots & \vdots \\ W_{I1} & W_{I2} & W_{I3} & \ldots & W_{IJ} \end{bmatrix}$$

$$\Omega(X) = W_{ij}(i = 1, 2; j = 1, 2) \tag{38}$$

$$= \begin{bmatrix} 1 & 0 \\ 1 & 1 \end{bmatrix}$$

$$\Omega(X^1) = \begin{bmatrix} 1 & 0 \\ 0 & 1 \end{bmatrix}, \Omega(X^2) = \begin{bmatrix} 0 & 0 \\ 1 & 0 \end{bmatrix}, \Omega(X^3) = \begin{bmatrix} 0 & 0 \\ 0 & 1 \end{bmatrix} \tag{39}$$

A target-information calculation unit 92b receives, in a similar manner to a target-information calculation unit 92 in Embodiment 1, a combination of ranges and range-change rates with respect to up-chirping and down-chirping for which the global-pair selecting unit 93 has selected, and then derives target information based on those received so as to be sent out.

Note that, although an example of two targets has been described in the explanation described above, it is needless to say that, in general, a number n (n>2) of targets can be also applied by extension.

According to the radar device in Embodiment 2 as described above, the identical-target determining means performs determination for an identical target, based on the chi-square test, from a range and range-change rate to a target obtained for each one of up-chirping and down-chirping, so that target-detection accuracy can be further increased.

Moreover, the identical-target determination is performed in which possible combinations in an environment with multiple targets is taken into an account, and an hypothesis is set up, so that it is possible to increase the target-detection accuracy in the environment with the multiple targets.

Embodiment 3

Figure 6:
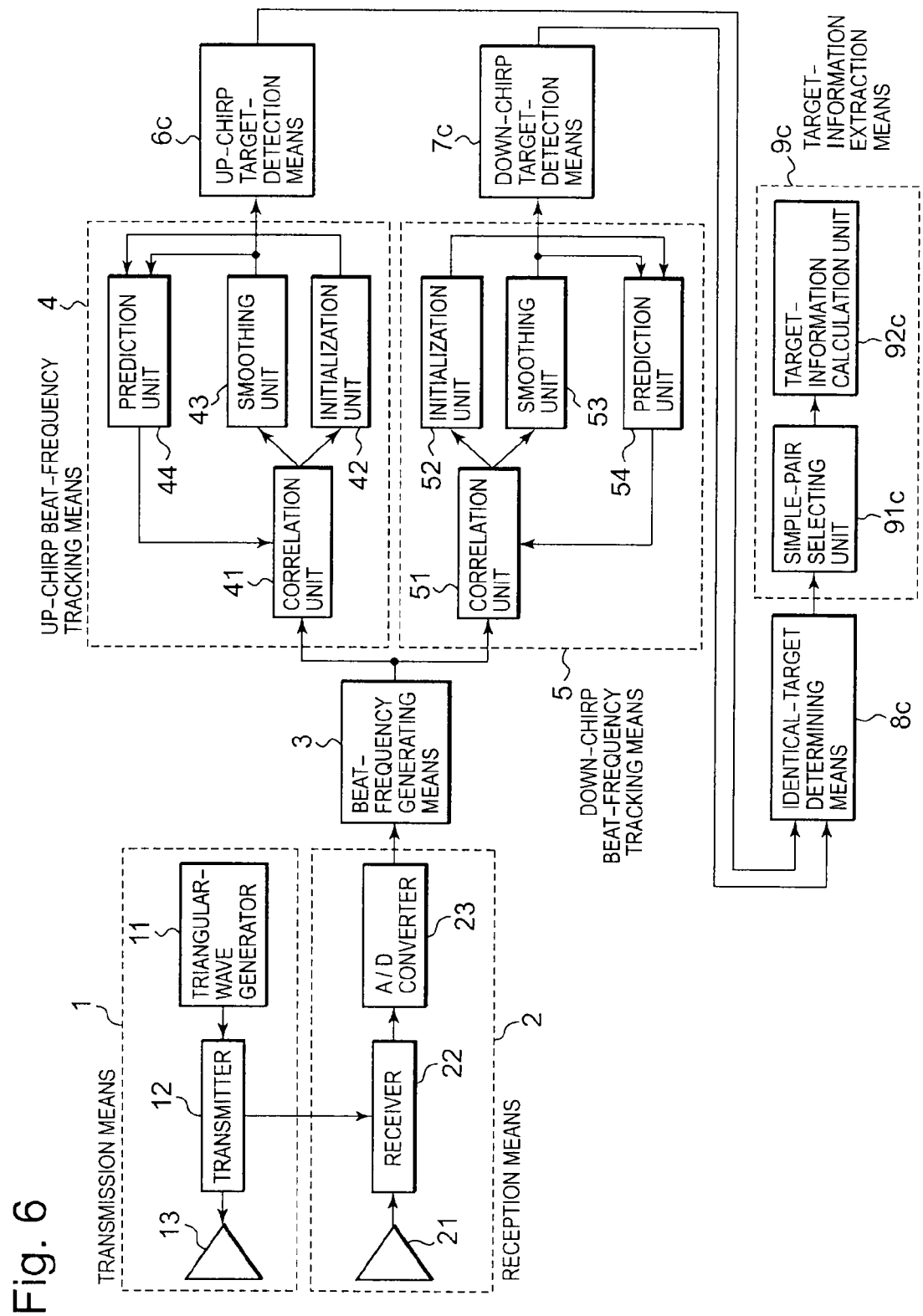
FIG. 6 is a diagram showing a configuration of a radar device in Embodiment 3 of the present invention.

A radar device in Embodiment 3 is a device in which processing operations are changed from those in the up-chirp target-detection means 6 and the down-chirp target-detection means 7 of the radar device in Embodiment 1. FIG. 6 is a block diagram showing a configuration of the radar device in Embodiment 3. In FIG. 6, the same reference numerals and symbols designate the same items as or items corresponding to those shown in FIG. 2. An up-chirp target-detection means 6c in this embodiment is distinguished by a feature in which, in place of the up-chirp target-detection means 6 in Embodiment 1 that calculates a range and range-change rate to a target, the up-chirp target-detection means 6c calculates a state vector of the target. In what follows, the processing by the up-chirp target-detection means 6c will be explained referring to FIG. 6.

The up-chirp target-detection means 6c receives TQ-values each for a provisional target m (m=1, 2, . . . , M), and determines as "target-detected" when a TQ-value exceeds a predetermined TQthre (threshold value). The provisional target having been determined as the "target-detected" is defined as a "detected target." In the up-chirp beat-frequency tracking means 4, there held and stored is time-series data that is a tracking-processing result corresponding to the detected target of a correlation-established up-chirping beat frequency, namely, a set of beat frequencies at different sampling times. At this time, an up-chirping beat frequency at an arbitrary sampling time is expressed by Equation (40). Equation (40) is the identical equation to Equation (25), the left-hand side in Equation (40) expresses an up-chirping beat frequency at a sampling time $t_k$ (k=1, 2, . . . , K), and the parameter "m" denotes a target number. In addition, "R" in the first term on the right-hand side denotes a range to the target number "m" a t a sampling time $t_k$; and "R-dot" in the second term, a range-change rate of the target number "m" a t a sampling time $t_k$. Similarly to the manners as set forth in Embodiment 1, because in Equation (40), a range and range-change rate to the target is different at each of sampling times, a plurality of such Equations (40) cannot be solved as a simultaneous equation without further augmenting a factor.

In this embodiment, a state vector $x_0^u$ of a target at a reference sampling time $t_0$ is defined as expressed by Equation (41), and the state vector $x_0^u$ of the target at an arbitrary sampling time $t_k$ is modeled as expressed by Equation (42). Here, the parameters x and y denote an x-coordinate component of the target and a y-coordinate component of the target, respectively; the parameters x-dot and y-dot denote an x-coordinate component of the target's velocity and a y-coordinate component of the target's velocity, respectively. In addition, based on the time-difference Δ between a reference sampling time $t_0$ and an arbitrary sampling time $t_k$ (refer to Equation (45)), a state transition matrix $\psi_k$ is defined as Equation (44). In Equation (44), $I_{2\times2}$ and $O_{2\times2}$ are a unit matrix and a zero matrix of two rows and two columns, respectively. And then, by using the state transition matrix, it is presumed that a state vector of the target at the arbitrary sampling time $t_k$ and a state vector of the target at the reference sampling time $t_0$ satisfy the relations of Equation (43). Therefore, it is assumed that the target holds a linear uniform motion for duration of the time-difference $\Delta$. On the other hand, a range and range-change rate to the target, and a state vector of the target satisfy the relations of Equation (46) and Equation (47). By rewriting Equation (40) using Equation (41) through Equation (47), it is possible to obtain a simultaneous equation with respect to the state vector of the target at a reference sampling time, so that, by solving the simultaneous equation, it is possible to calculate the state vector of the target at a reference sampling time. A state vector of the target at an arbitrary sampling time can be calculated by Equation (43) using the state vector of the target having been calculated at a reference sampling time $t_0$.

$$f_{b,k}^u(m) = \frac{2B}{cT}R_k^u(m) + \frac{f_0}{c}2\dot{R}_k^u(m) \tag{40}$$

$$x_0^u = [\, x_0^u \; y_0^u \; \dot{x}_0^u \; \dot{y}_0^u \,]^T \tag{41}$$

$$x_k^u = [\, x_k^u \; y_k^y \; \dot{x}_k^u \; \dot{y}_k^u \,]^T \tag{42}$$

$$x_k^u = \Psi_k x_0^u \tag{43}$$

$$\Psi_k = \begin{bmatrix} I_{2\times2} & \Delta I_{2\times2} \\ O_{2\times2} & I_{2\times2} \end{bmatrix} \tag{44}$$

$$\Delta = t_k - t_0 \tag{45}$$

$$R_k^u = \sqrt{(x_k^u)^2 + (y_k^u)^2} \tag{46}$$

$$\dot{R}_k^u = \frac{x_k^u \dot{x}_k^u + y_k^u \dot{y}_k^u}{\sqrt{(x_k^u)^2 + (y_k^u)^2}} \tag{47}$$

A down-chirp target-detection means 7c also receives time-series data of a correlation-established down-chirping beat frequency for a provisional target obtained by the down-chirp beat-frequency tracking means 5; and, in similar procedural steps to the processing in the up-chirp target-detection means 6c, the down-chirp target-detection means calculates a state vector of the target at a reference sampling time. Note that, in Equation (40) through Equation (47), it is necessary to use the equations in which the superscript suffixes of respective parameters are replaced from u to d, and the sign of the second term on the right-hand side in Equation (40), i.e. "+," is replaced to the minus sign (−); other procedural steps are the same, and so their detailed explanation is omitted.

An identical-target determining means 8c receives the outputs from the up-chirp target-detection means 6c and the down-chirp target-detection means 7c, and carries out the determination whether or not a detected target at the time of up-chirping is the same as a detected target at the time of down-chirping. A criterion on the identical-target determination is that, when a state vector of a target m obtained at the time of up-chirping and a state vector of a target n obtained at the time of down-chirping are within a constant bound, those obtained for the detected targets are determined as for an identical target. For example, when state vectors of the target m and the target n simultaneously satisfy Equation (48) through Equation (51) or the vectors satisfy Equation (52), the vectors are determined as for an identical target. Note that, in Equation (48) through Equation (51), the parameters $\Delta x$ and $\Delta y$ are a position threshold-value in an x-axis direction and that in a y-axis direction, respectively; the parameters $\Delta$x-dot and $\Delta$y-dot are a velocity threshold-value in an x-axis direction and that in a y-axis direction, respectively. In addition, in Equation (52), the parameters $\sigma_x$ and $\sigma_y$ are position estimation accuracy in an x-axis direction and that in a y-axis direction, respectively; the parameters $\sigma_{x\text{-}dot}$ and $\sigma_{y\text{-}dot}$ are velocity estimation accuracy in an x-axis direction and that in a y-axis direction, respectively; and the parameter a is a determination threshold-value.

When there exists a plurality of combinations of target information each determined as for one detected target by the identical-target determining means 8c that simultaneously satisfies Equations (48) through (51) or that satisfies Equation (52), a simple-pair selecting unit 91c in a target-information extraction means 9c selects an evaluation value on the left-hand sides each in Equations (48) through (51) or that in Equation (52) is minimized.

$$|x^u(m) - x^d(n)| \leq \Delta x \tag{48}$$

$$|y^u(m) - y^d(n)| \leq \Delta y \tag{49}$$

$$|\dot{x}^u(m) - \dot{x}^d(n)| \leq \Delta \dot{x} \tag{50}$$

$$|\dot{y}^u(m) - \dot{y}^d(n)| \leq \Delta \dot{y} \tag{51}$$

$$\frac{(x^u(m) - x^d(n))^2}{\sigma_x^2} + \frac{(y^u(m) - y^d(n))^2}{\sigma_y^2} + \frac{(\dot{x}^u(m) - \dot{x}^d(n))^2}{\sigma_{\dot{x}}^2} + \frac{(\dot{y}^u(m) - \dot{y}^d(n))^2}{\sigma_{\dot{y}}^2} \leq \Delta \tag{52}$$

A target-information calculation unit 92c transforms state vectors of the target in up-chirping and down-chirping having been obtained by the simple-pair selecting unit 91c into ranges and range-change rates by using Equations (46) and (47), and then derives target information by using these ranges and range-change rates so as to be sent out. In a method of deriving target information, in a similar manner to the target-information calculation unit 92 in Embodiment 1, for example, either one of the pairs of ranges and range-change rates corresponding to up-chirping and down-chirping, which minimizes a volume of a updated state covariance matrix in Equation (17), can be selected as the target information.

Note that, although movement of the target is expressed as two-dimensional movement, and state vectors are configured with x- and y-coordinate components in the above explanation, it is easy to extend configuring the state vectors with x-, y- and z-coordinate components by presuming the movement of a target as three-dimensional movement.

According to the radar device in Embodiment 3 as described above, because target determination is carried out by tracking processing on beat frequencies each obtained at the time of up-chirping and at that of down-chirping, state vectors of a target are calculated from time-series data of a beat frequency, and the correlation to the same or identical target is determined from those state vectors, so that it is possible to increase target-detection accuracy in a case in which a time-interval in time-series data of a beat frequency is large, when compared with that the tracking processing is performed based on a range and range-change rate.

Embodiment 4

Figure 7:
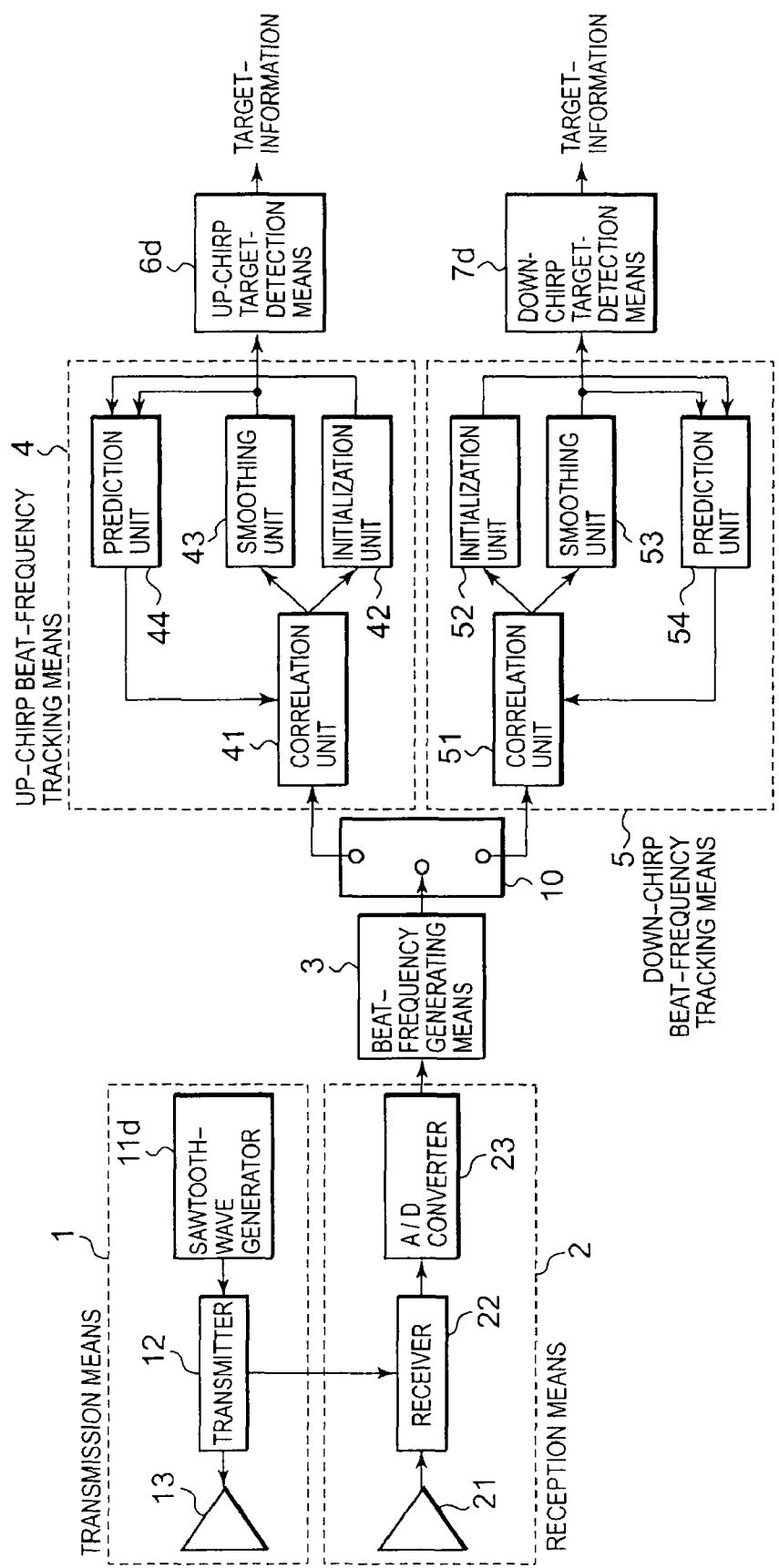
FIG. 7 is a diagram showing a configuration of a radar device in Embodiment 4 of the present invention.

A radar device in Embodiment 4 is distinguished by a feature in which the device's operations are made possible only in either an up-chirp beat-frequency tracking means or a down-chirp beat-frequency tracking means by making an addition of a signal switching unit to the radar device in Embodiment 1. FIG. 7 is a block diagram showing a configuration of the radar device in Embodiment 4. In FIG. 7, the same reference numerals and symbols designate the same items as or items corresponding to those shown in FIG. 2; thus, their explanation is omitted. Note that, the identical-target determining means 8 and the target-information extraction means 9 having been used in Embodiment 1 are not used. In what follows, the operations of the radar device will be explained referring to FIG. 7.

Here, a sawtooth-wave generator 11*d* in a transmission means 1 generates a saw-toothed periodic signal and supplies it into the transmitter 12 as a modulation signal. As for a waveform of the sawtooth wave, there are one type that repeats a monotonic increase and the other one that repeats a monotonic decrease, and so the sawtooth-wave generator 11*d* generates either one type of the sawtooth waves, based on an instruction from a control unit that is not shown in the figure. Here, one operation mode applying a sawtooth wave of the monotonic increase type is defined as an up-chirp mode, and the other one applying a sawtooth wave of the monotonic decrease type, as a down-chirp mode.

Figure 8:
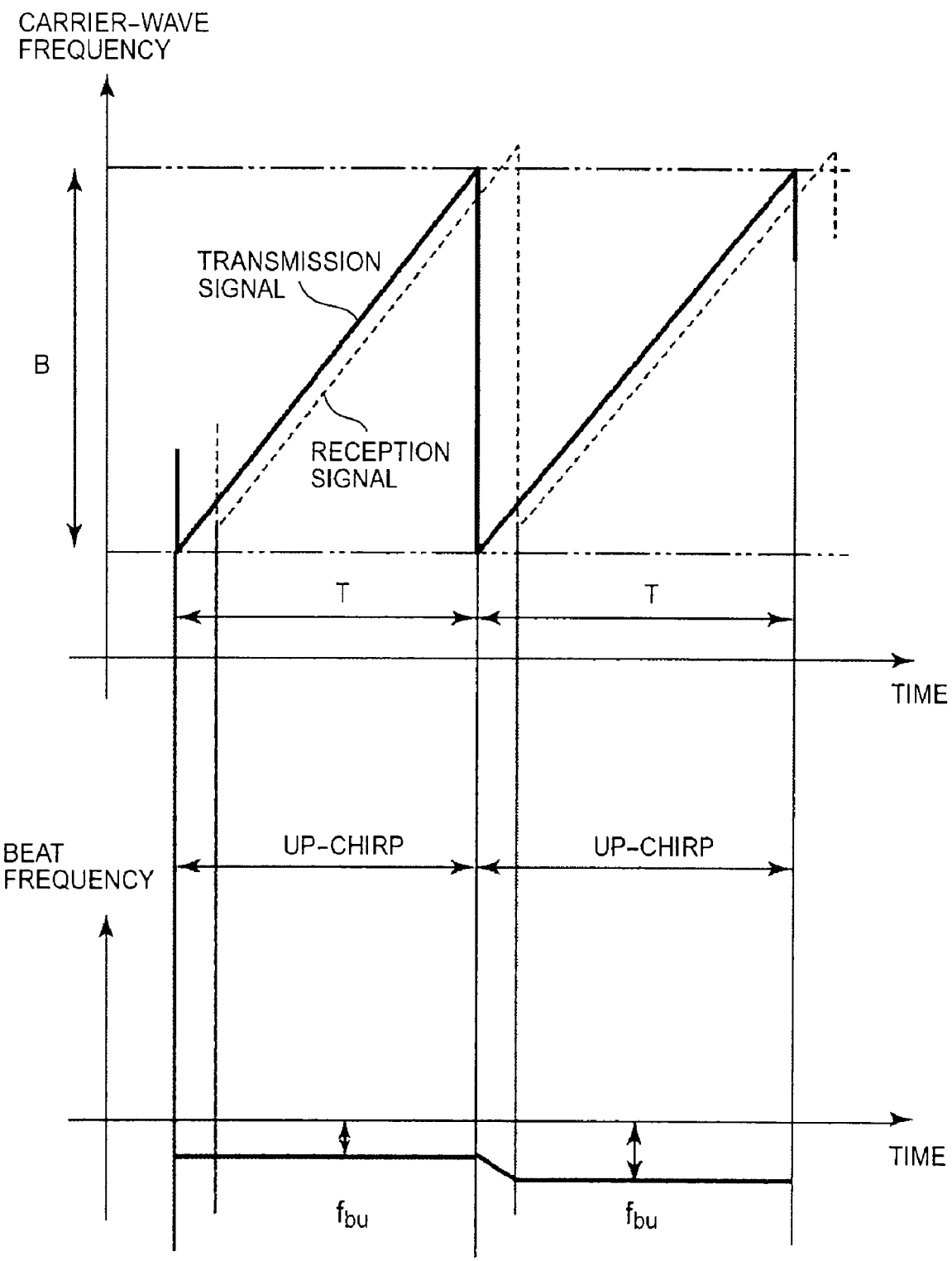
FIG. 8 is a diagram illustrating changes in carrier-wave frequencies associated with transmission/reception signals transmitted/received by a radar device, and changes in a beat frequency attributed to a beat signal.

The transmitter 12 generates a transmission signal by frequency-modulating a carrier wave by using the saw-toothed modulation signal. The transmission signal is transmitted from a transmitting antenna 13. FIG. 8 illustrates the transmission signal that changes on a monotonic increase at the time of the up-chirp mode over a period T in each of sweep time-intervals in the bounds of a frequency modulation width B. Frequency changes of the transmission signal can be similarly illustrated at the time of the down-chirp mode.

The reception means 2 and the beat-frequency generating means 3 generate a beat frequency both from a reception signal received by the antenna 21 and the transmission signal having been generated by the transmission means 1 in a similar manner to Embodiment 1. A signal switching unit 10 establishes, based on an instruction from the control unit described above (not shown in the figures), a signal path so that an output signal of the beat-frequency generating means 3 is inputted into the up-chirp beat-frequency tracking means 4 at the time of the up-chirp mode, and also that the output signal of the beat-frequency generating means 3 is inputted into the down-chirp beat-frequency tracking means 5 at the time of the down-chirp mode.

Presuming now that the radar device is operating in the up-chirp mode, an up-chirping beat frequency having been generated by the beat-frequency generating means 3 is inputted into the up-chirp beat-frequency tracking means 4. And then, the up-chirp beat-frequency tracking means 4 outputs time-series data of a correlation-established up-chirping beat frequency for a provisional target by performing the tracking processing, according to the procedures described in Embodiment 1. An up-chirp target-detection means 6*d* outputs, after having calculated a range and range-change rate to a target based on the time-series data of the beat frequency, the calculated ones as up-chirping target information in similar procedures to the up-chirp target-detection means 6 described in Embodiment 1.

When the radar device is operating in the down-chirp mode, a down-chirping beat frequency having been generated by the beat-frequency generating means 3 is inputted into the down-chirp beat-frequency tracking means 5, and then, the down-chirp beat-frequency tracking means 5 outputs time-series data of a correlation-established down-chirping beat frequency for a provisional target by performing the tracking processing. A down-chirp target-detection means 7*d* outputs, after having calculated a range and range-change rate to a target based on the time-series data of the beat frequency, the calculated ones as down-chirping target information in similar procedures to the down-chirp target-detection means 7 described in Embodiment 1.

According to the radar device in Embodiment 4 as described above, a signal path inside the radar device is allowed to change over by the signal switching unit, and at the same time, a calculation result in either the up-chirp target-detection means or the down-chirp target-detection means can be individually outputted therefrom, so that it is possible to detect a range and range-change rate to a target even when the beat frequency is observed only at the time of either up-chirping or down-chirping. In addition, the target information can be obtained without performing the identical-target determination and either up-chirp or down-chirp tracking processing, so that a calculation time can be shortened. Moreover, the beat-frequency tracking means and the target-detection means are separately provided for up-chirping and down-chirping each, so that the observed data is individually held for either up-chirping or down-chirping, even when the operation mode is changed over. Therefore, the tracking processing can be continued by making use of previously observed data without initializing either the initialization unit 42 or the initialization unit 52 at the time of the mode changeover.

Note that, by introducing the signal switching unit similarly for the radar device in Embodiment 3, it is also possible to configure that the up-chirping target information and the down-chirping target information are individually outputted.

Embodiment 5

Figure 9:
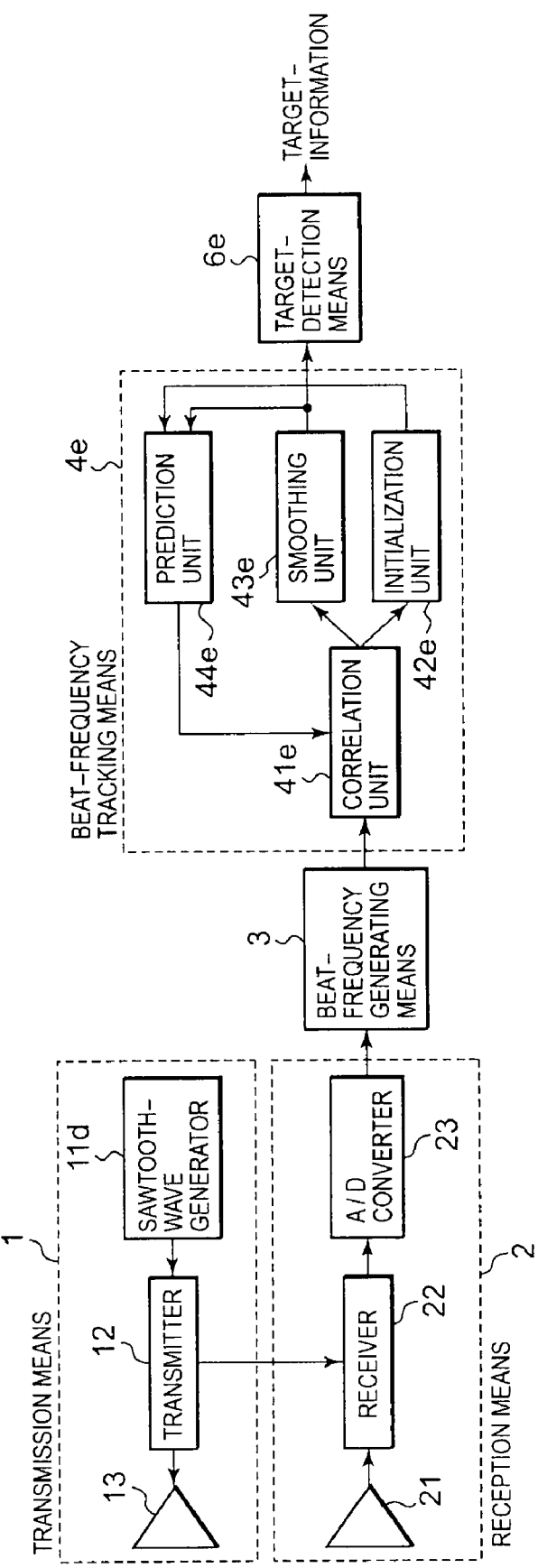
FIG. 9 is a diagram showing a configuration of a radar device in Embodiment 5 of the present invention.

In a radar device in Embodiment 5, one pair of the beat-frequency tracking means and the target-detection means is removed from the radar device in Embodiment 4, and the remaining one pair of the beat-frequency tracking means and the target-detection means serves double duty as for up-chirping and down-chirping. FIG. 9 is a block diagram showing a configuration of the radar device in Embodiment 5. In FIG. 9, the same reference numerals and symbols designate the same items as or items corresponding to those shown in FIG. 7; thus, their explanation is omitted.

The operations of the transmission means 1, the reception means 2 and the beat-frequency generating means 3 are the same as those in Embodiment 4. When the radar device is operating in the up-chirp mode, only an up-chirping beat frequency is outputted from the beat-frequency generating means 3. A beat-frequency tracking means 4*e* having the same internal configuration as the up-chirp beat-frequency tracking means 4 performs tracking processing based on the beat frequency inputted from the beat-frequency generating means 3, and outputs time-series data of a correlation-established beat frequency for a provisional target. A target-detection means 6*e* having the same functions as the up-chirp target-detection means 6*d* outputs, after having calculated a range and range-change rate to a target based on the time-series data of the beat frequency, the calculated one as up-chirping target information.

When the radar device is operating in the down-chirp mode, only a down-chirping beat frequency is outputted from the beat-frequency generating means 3. The beat-frequency tracking means 4*e* performs tracking processing based on the beat frequency inputted from the beat-frequency generating means 3, and outputs time-series data of a correlation-established beat frequency for a provisional target. The target-detection means 6e outputs, after having calculated a range and range-change rate to a target based on the time-series data of the beat frequency, the calculated one as down-chirping target information.

In the radar device in Embodiment 5, when the mode is changed over between the up-chirp and down-chirp modes, an initialization unit 42e of the beat-frequency tracking means 4e is initialized at the time of the mode change-over. For this reason, the tracking processing cannot be continued as the radar device in Embodiment 4 does by making use of previously observed data at the time of the mode change-over. However, because only one pair of the beat-frequency tracking means and the target-detection means is provided, there are such advantages that a configuration of the radar device can be simplified, and reduction of device costs can be achieved.

While the present invention has been shown and described in detail, the foregoing description is in all aspects illustrative and not restrictive. It is therefore understood that numerous modifications and variations can be realized without departing from the scope of the invention.

What is claimed is:

1. A radar device comprising:
   a transmission means for generating a transmission signal whose frequency periodically increases and decreases in a constant modulation width, and for radiating the transmission signal into space;
   a reception means for acquiring a reception signal by receiving a reflected signal of the transmission signal by a target, and for generating a beat signal by mixing the reception signal with the transmission signal;
   a beat-frequency generating means for obtaining a first beat-frequency distribution from the beat signal at the time of up-chirping in which the frequency of the transmission signal ascends so as to determine a frequency peak in the first beat-frequency distribution, and for obtaining a second beat-frequency distribution from the beat signal at the time of down-chirping in which the frequency of the transmission signal descends so as to determine a frequency peak in the second beat-frequency distribution;
   an up-chirp beat-frequency tracking means for performing tracking processing on a frequency peak in the first beat-frequency distribution over a span of a plurality of up-chirping time-intervals, and for generating first beat-frequency time-series data from the frequency peak whose correlation is obtained by the tracking processing;
   an up-chirp target-detection means for calculating a first range and range-change rate to the target from the first beat-frequency time-series data;
   a down-chirp beat-frequency tracking means for performing tracking processing on a frequency peak in the second beat-frequency distribution over a span of a plurality of down-chirping time-intervals, and for generating second beat-frequency time-series data from the frequency peak whose correlation is obtained by the tracking processing; and
   a down-chirp target-detection means for calculating a second range and range-change rate to the target from the second beat-frequency time-series data.

2. The radar device as set forth in claim 1, further comprising an identical-target determining means for determining whether or not the first range and range-change rate calculated by the up-chirp target-detection means and the second range and range-change rate calculated by the down-chirp target-detection means correlate with the identical target.

3. The radar device as set forth in claim 2, further comprising a target-information extraction means for calculating a range and range-change rate to the target, from the first range and range-change rate and the second range and range-change rate that have been determined correlating with the identical target by the identical-target determining means, and then outputting said calculated range and range-change rate as target information.

4. The radar device as set forth in claim 3, wherein the target-information extraction means selects, when there exists a plurality of combinations of the first range and range-change rate and the second range and range-change rate that have been determined correlating with the identical target by the identical-target determining means, any one of the combinations out of the plurality of combinations, and outputs target information based on the selected combination.

5. The radar device as set forth in claim 3 or claim 4, wherein the target-information extraction means weights and combines the first range and range-change rate and the second range and range-change rate that have been determined correlating with the identical target, and outputs, as target information, a range and range-change rate obtained by combining.

6. The radar device as set forth in claim 3 or claim 4, wherein with respect to the first range and range-change rate and the second range and range-change rate that have been determined correlating with the identical target, the target-information extraction means outputs, as target information, either the first range or range-change rate and the second range and range-change rate.

7. The radar device as set forth in any one of claims 2 through 4, wherein the identical-target determining means determines, based on the chi-square test, whether or not the first range and range-change rate and the second range and range-change rate correlate with the identical target.

8. The radar device as set forth in any one of claims 3 through 4, wherein
   the identical-target determining means derives a correlation matrix that indicates a correlation probability in which a plurality of first ranges and range-change rates and a plurality of second ranges and range-change rates correlate with the identical target; and
   the target-information extraction means determines, based on the correlation matrix, the first range and range-change rate and the second range and range-change rate that correlate with the identical target, and outputs target information based on the determination.

9. A radar device comprising:
   a transmission means for generating a transmission signal whose frequency periodically increases and decreases in a constant modulation width, and for radiating the transmission signal into space;
   a reception means for acquiring a reception signal by receiving a reflected signal of the transmission signal by a target, and for generating a beat signal by mixing the reception signal with the transmission signal;
   a beat-frequency generating means for obtaining a first beat-frequency distribution from the beat signal at the time of up-chirping in which the frequency of the transmission signal ascends so as to determine a frequency peak in the first beat-frequency distribution, and for obtaining a second beat-frequency distribution from the beat signal at the time of down-chirping in which the frequency of the transmission signal descends so as to determine a frequency peak in the second beat-frequency distribution;

an up-chirp beat-frequency tracking means for performing tracking processing on a frequency peak in the first beat-frequency distribution over a span of a plurality of up-chirping time-intervals, and for generating first beat-frequency time-series data from the frequency peak whose correlation is obtained by the tracking processing;

an up-chirp target-detection means for calculating a first state vector of the target from the first beat-frequency time-series data;

a down-chirp beat-frequency tracking means for performing tracking processing on a frequency peak in the second beat-frequency distribution over a span of a plurality of down-chirping time-intervals, and for generating second beat-frequency time-series data from the frequency peak whose correlation is obtained by the tracking processing; and a down-chirp target-detection means for calculating a second state vector of the target from the second beat-frequency time-series data.

10. The radar device as set forth in claim 9, further comprising an identical-target determining means for determining whether or not the first state vector calculated by the up-chirp target-detection means and the second state vector calculated by the down-chirp target-detection means correlate with the identical target.

11. The radar device as set forth in claim 10, further comprising a target-information extraction means for calculating a range and range-change rate to the target from the first state vector and the second state vector that have been determined correlating with the identical target by the identical-target determining means, and for outputting the range and range-change rate as target information.

12. The radar device as set forth in claim 1 or claim 9, further comprising a signal switching unit for establishing a signal path so as to output the beat signal generated by the beat-frequency generating means into either the up-chirp beat-frequency tracking means or the down-chirp beat-frequency tracking means.

13. A radar device comprising:
a transmission means for generating a transmission signal whose frequency periodically increases and decreases in a constant modulation width, and for radiating the transmission signal into space;
a reception means for acquiring a reception signal by receiving a reflected signal of the transmission signal by a target, and for generating a beat signal by mixing the reception signal with the transmission signal;
a beat-frequency generating means for obtaining a beat-frequency distribution from the beat signal at either the time of up-chirping in which the frequency of the transmission signal ascends or the time of down-chirping in which the frequency of the transmission signal descends so as to determine a frequency peak in the beat-frequency distribution;
a beat-frequency tracking means for performing tracking processing on a frequency peak in the beat-frequency distribution over either a span of a plurality of up-chirping time-intervals or a span of a plurality of down-chirping time-intervals, and for generating beat-frequency time-series data from the frequency peak whose correlation is obtained by the tracking processing; and
a target-detection means for calculating a range and range-change rate to the target from the beat-frequency time-series data.

14. A radar processing method, comprising:
a transmission step of generating a transmission signal whose frequency periodically increases and decreases in a constant modulation width, and of radiating the transmission signal into space;
a reception step of acquiring a reception signal by receiving a reflected signal of the transmission signal by a target, and of generating a beat signal by mixing the reception signal with the transmission signal;
a beat-frequency generation step of obtaining a first beat-frequency distribution from the beat signal at the time of up-chirping in which the frequency of the transmission signal ascends so as to determine a frequency peak in the first beat-frequency distribution, and of obtaining a second beat-frequency distribution from the beat signal at the time of down-chirping in which the frequency of the transmission signal descends so as to determine a frequency peak in the second beat-frequency distribution;
an up-chirp-beat-frequency tracking step of performing tracking processing on a frequency peak in the first beat-frequency distribution over a span of a plurality of up-chirping time-intervals, and of generating first beat-frequency time-series data from the frequency peak whose correlation is obtained by the tracking processing;
an up-chirp-target detection step of calculating a first range and range-change rate to the target from the first beat-frequency time-series data;
a down-chirp-beat-frequency tracking step of performing tracking processing on a frequency peak in the second beat-frequency distribution over a span of a plurality of down-chirping time-intervals, and of generating second beat-frequency time-series data from the frequency peak whose correlation is obtained by the tracking processing; and
a down-chirp-target detection step of calculating a second range and range-change rate to the target from the second beat-frequency time-series data.

15. The radar processing method as set forth in claim 14, further comprising an identical-target determination step of determining whether or not the first range and range-change rate calculated at the up-chirp-target detection step and the second range and range-change rate calculated at the down-chirp-target detection step correlate with the identical target.

16. The radar processing method as set forth in claim 15, further comprising a target-information extraction step of calculating a range and range-change rate to the target, from the first range and range-change rate and the second range and range-change rate that have been determined correlating with the identical target at the identical-target determination step, and then outputting said calculated range and range-change rate as target information.

17. The radar processing method as set forth in claim 16, wherein in the target-information extraction step, when there exists a plurality of combinations of the first range and range-change rate and the second range and range-change rate that have been determined correlating with the identical target at the identical-target determination step, any one combination out of the plurality of combinations is selected, and the target information is outputted based on the selected combination.

18. The radar processing method as set forth in claim 16 or claim 17, wherein in the target-information extraction step, weighting and combining are performed on the first range and range-change rate and the second range and range-change rate that have been determined correlating with the identical target, and a range and range-change rate obtained by the combining are outputted as the target information.

19. The radar processing method as set forth in claim 16 or claim 17, wherein in the target-information extraction step, with respect to the first range and range-change rate and the second range and range-change rate that have been determined correlating with the identical target, either the first range or range-change rate and the second range and range-change rate is outputted as the target information.

20. The radar processing method as set forth in any one of claims 15 through 17, wherein in the identical-target determination step, determination is performed based on the chi-square test, whether or not the first range and range-change rate and the second range and range-change rate correlate with the identical target.

21. The radar processing method as set forth in any one of claims 16 through 17, wherein
    in the identical-target determination step, a correlation matrix is derived that indicates a correlation probability in which a plurality of first ranges and range-change rates and a plurality of second ranges and range-change rates correlate with the identical target; and
    in the target-information extraction step, the first range and range-change rate and the second range and range-change rate that correlate with the identical target are determined based on the correlation matrix, and target information is outputted based on the determination.

22. A radar processing method, comprising:
    a transmission step of generating a transmission signal whose frequency periodically increases and decreases in a constant modulation width, and of radiating the transmission signal into space;
    a reception step of acquiring a reception signal by receiving a reflected signal of the transmission signal by a target, and of generating a beat signal by mixing the reception signal with the transmission signal;
    a beat-frequency generation step of obtaining a first beat-frequency distribution from the beat signal at the time of up-chirping in which the frequency of the transmission signal ascends so as to determine a frequency peak in the first beat-frequency distribution, and of obtaining a second beat-frequency distribution from the beat signal at the time of down-chirping in which the frequency of the transmission signal descends so as to determine a frequency peak in the second beat-frequency distribution;
    an up-chirp-beat-frequency tracking step of performing tracking processing on a frequency peak in the first beat-frequency distribution over a span of a plurality of up-chirping time-intervals, and of generating first beat-frequency time-series data from the frequency peak whose correlation is obtained by the tracking processing;
    an up-chirp-target detection step of calculating a first state vector of the target from the first beat-frequency time-series data;
    a down-chirp-beat-frequency tracking step of performing tracking processing on a frequency peak in the second beat-frequency distribution over a span of a plurality of down-chirping time-intervals, and of generating second beat-frequency time-series data from the frequency peak whose correlation is obtained by the tracking processing; and
    a down-chirp-target detection step of calculating a second state vector of the target from the second beat-frequency time-series data.

23. The radar processing method as set forth in claim 22, further comprising an identical-target determination step of determining whether or not the first state vector calculated at the up-chirp-target detection step and the second state vector calculated at the down-chip-target detection step correlate with the identical target.

24. The radar processing method as set forth in claim 23, further comprising a target-information extraction step of calculating a range and range-change rate to the target from the first state vector and the second state vector that have been determined correlating with the identical target at the identical-target determination step, and of outputting the range and range-change rate as the target information.

25. The radar processing method as set forth in claim 14 or claim 22, further comprising a signal switching step of establishing a signal path so as to output the beat signal generated at the beat-frequency generation step for either the up-chirp-beat-frequency tracking step or the down-chirp-beat-frequency tracking step.

26. A radar processing method, comprising:
    a transmission step of generating a transmission signal whose frequency periodically increases and decreases in a constant modulation width, and of radiating the transmission signal into space;
    a reception step of acquiring a reception signal by receiving a reflected signal of the transmission signal by a target, and of generating a beat signal by mixing the reception signal with the transmission signal;
    a beat-frequency generation step of obtaining a beat-frequency distribution from the beat signal at either the time of up-chirping in which the frequency of the transmission signal ascends or the time of down-chirping in which the frequency of the transmission signal descends so as to determine a frequency peak in the beat-frequency distribution;
    an up-chirp-beat-frequency tracking step of performing tracking processing on a frequency peak in the beat-frequency distribution over either a span of a plurality of up-chirping time-intervals or a span of a plurality of down-chirping time-intervals, and of generating beat-frequency time-series data from the frequency peak whose correlation is obtained by the tracking processing; and
    a target detection step of calculating a range and range-change rate to the target from the beat-frequency time-series data.

* * * * *